United States Patent

Nesteruk

[15] 3,645,778

[45] Feb. 29, 1972

[54] METAL OXIDE COATINGS ON GLASS

[72] Inventor: Edward P. Nesteruk, Toledo, Ohio

[73] Assignee: Owens-Illinois, Inc.

[22] Filed: Jan. 6, 1969

[21] Appl. No.: 789,199

[52] U.S. Cl................................117/93.4, 117/104, 117/105.3
[51] Int. Cl...............................................................B05b 5/02
[58] Field of Search................117/93.4 R, 93.4 NC, 93.41,
 117/93.42, 93.43, 93.44, 105.3, 105.5, 104 R, 124
 R, 124 D, 33.3, 94

[56] References Cited

UNITED STATES PATENTS

| | | | |
|---|---|---|---|
| 2,794,751 | 6/1957 | Juvinall | 117/105.3 X |
| 3,081,200 | 3/1963 | Thompkins | 117/104 X |
| 3,438,803 | 4/1969 | Dubble et al. | 117/105.3 X |

FOREIGN PATENTS OR APPLICATIONS

| | | | |
|---|---|---|---|
| 905,390 | 9/1962 | Great Britain | 117/105.3 |

Primary Examiner—Ralph S. Kendall
Assistant Examiner—Caleb Weston
Attorney—D. T. Innis and E. J. Holler

[57] ABSTRACT

While being nonrotatably transported along a flight conveyor, glass containers are electrostatically treated with colored metal oxide film-forming organometallic compounds. The organometallic compounds are electrostatically sprayed in a nonflammable solvent system containing a halogenated solvent while a horizontal flow of air is provided across the flight conveyor in impinging relation with respect to the container being treated.

14 Claims, 1 Drawing Figure

PATENTED FEB 29 1972 3,645,778
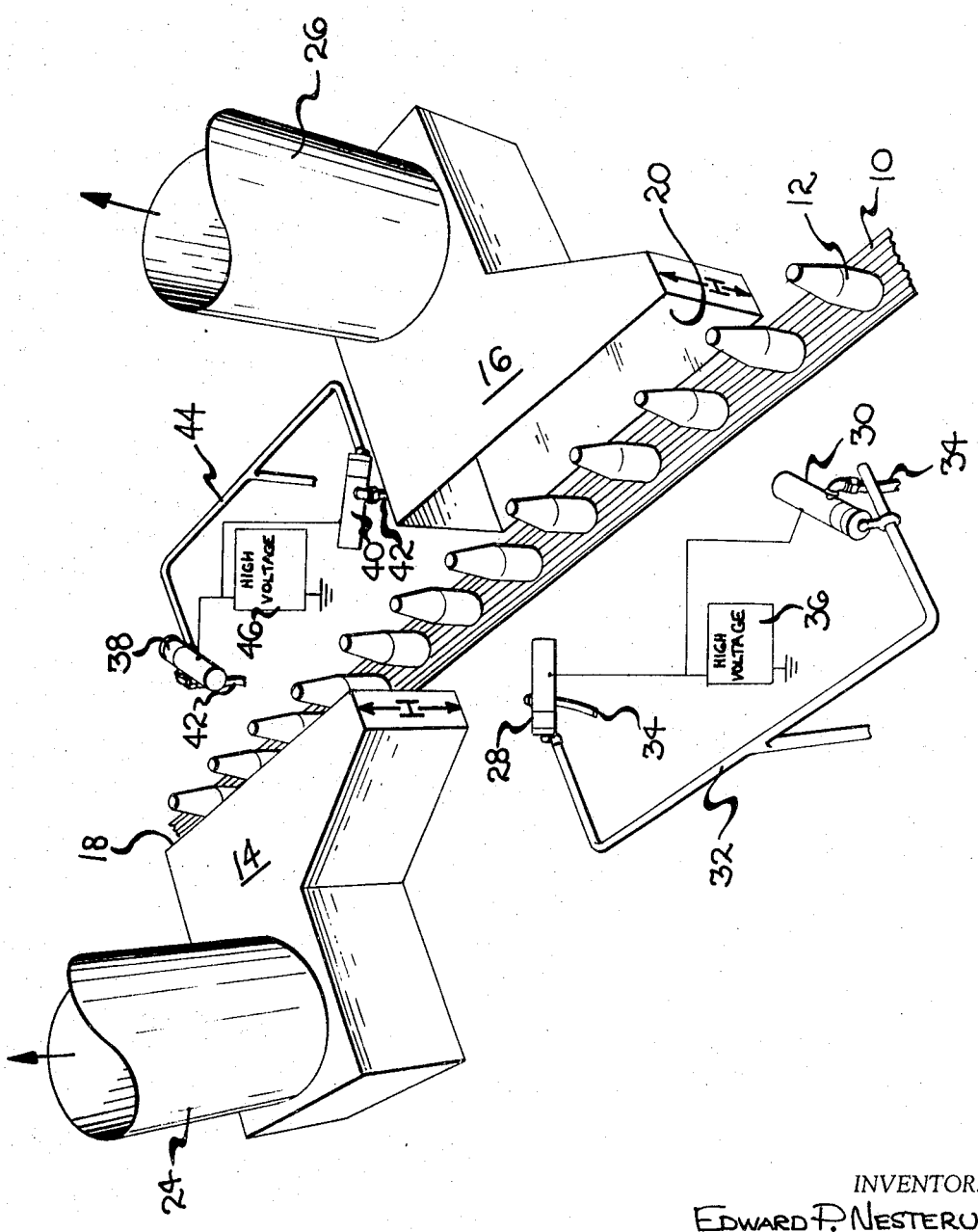
INVENTOR.
EDWARD P. NESTERUK
BY
ATTORNEYS

METAL OXIDE COATINGS ON GLASS

BACKGROUND OF THE INVENTION

This invention relates to the formation of metal oxide coatings on glass surfaces and more particularly it relates to a method and apparatus for electrostatically applying metal oxide film-forming organometallic compounds onto a hot glass surface to provide a colored decorative coating thereon.

It is generally known in the glass industry that various organometallic compounds may be applied in the form of a spray onto a hot glass surface whereby these compounds pyrolyze to form an oxide of the metal on the glass surface. As contemplated herein, the metal oxide which is to be formed on the surface of a glass container are those oxides which produce visibly colored films or coatings and thus may be used to decorate the surface of a glass container to increase its aesthetic appeal.

While various organometallic compounds are known to pyrolyze when contacted with a hot glass surface to form a colored metal oxide film on the glass surface, these materials have not been used to any significant degree for purposes of decorating glass containers. One reason for this resides in the fact that the rate at which these oxides are formed on a glass surface is not compatible with high production speeds employed in the glass container industry. That is, glass containers are typically manufactured and transported along a flight conveyor at speeds of approximately 120 to 200 bottles per minute; these speeds are significantly greater than the rate at which an appropriate colored metal oxide coating can be formed on a glass surface according to prior art techniques. Consequently, it has heretofore been uneconomical to form colored metal oxide coatings on the surfaces of glass containers. Additionally, the methods and apparatus employed in the past produce metal oxide coatings having poor thickness uniformity. Because of the lack of desirable uniformity, there frequently exists on the container localized halo portions which detrimentally influence the aesthetic appeal of the container. The only effective way of minimizing the degree of coating nonuniformity would require the installation of equipment along the path of a flight conveyor which provides for the rotation of the glass containers while the colored metal oxide film-forming compound is sprayed thereon. Those skilled in the art, however, readily appreciate the fact that, because of the high rates at which glass containers are manufactured and the low rates at which the oxides are formed when employing prior art techniques, it is highly impractical to install equipment along the path of the flight conveyor providing for the rotation of the containers.

Two other problems which must be coped with in applying metal oxide film-forming compounds according to prior art techniques are, first of all, when applied, the resulting coatings have present thereon a dust which provides the surface with an undesirable grainy appearance. Secondly, the prior art techniques are highly inefficient and, therefore, especially in view of the competitive situation in the glass container industry, have not been utilized to any great extent because of the additional cost which is incurred in using these inefficient techniques. These problems exist independently of whether or not the containers are rotated.

Those skilled in the art will readily appreciate the fact that if acceptable colored decorative metal oxide coatings can be formed on glass containers without the need of rotating the containers as they are transported along a flight conveyor and at rates which correspond to current production speeds, the method and apparatus by which this is done would find great acceptance in the industry.

SUMMARY OF THE INVENTION

In accordance with this invention, there is provided an improved, more efficient method and apparatus whereby glass containers may be provided with colored decorative metal oxide coatings without rotation and at rates which are compatible with current glass container production speeds. Additionally, the grainy appearance of the prior art coatings is now eliminated, or at least substantially minimized, and the resulting coating is of a substantially uniform thickness.

The foregoing and other advantageous features of this invention are preferably accomplished by electrostatically spraying a pyrolyzable organometallic film-forming compound in a chlorinated solvent system onto the surface of freshly formed glass containers as they are transported along a flight conveyor without rotation and by employing a horizontal flow of air across the container-supporting surface which impinges upon the sprayed containers, the flow of air being at right angles with respect to direction of container movement.

BRIEF DESCRIPTION OF THE DRAWINGS

In general, FIG. 1 is a perspective view illustrating an embodiment of this invention.

DESCRIPTION OF PREFERRED EMBODIMENT(S)

Referring now more specifically to the drawing, there is generally shown a flight conveyor 10 having a container-support surface for transporting a series array of upright glass containers 12 whose surfaces are to be coated to provide a colored decorative effect thereon. Typically, conveyor 10 will be disposed intermediate the glass forming machine and the annealing, whereby freshly formed glass containers will be transported from the former to the latter.

Mounted alongside conveyor 10 by suitable means (not shown) are two opposed hood members 14 and 16 respectively, which are displaced from each other in the direction of movement of the containers along conveyor 10. These hood members respectively provide the means by which oppositely directed independent streams of air are caused to flow across the conveyor at right angles to the direction of container movement in a pattern which is generally parallel to the plane defined by the upper container-supporting surface of conveyor 10. That is, each hood is so arranged that there exists a generally horizontal flow of air which impinges upon the transported containers; the direction of air flow is toward the hood and in general normal to the direction of movement of the containers along conveyor 10. According to the preferred embodiment, hood 14 is provided with an open face 18 and hood 16 is provided with an open face 20, both open faces extending a substantial distance adjacently along opposite sides of conveyor 10 and displaced parallel to the direction of container movement. This invention will most advantageously be practiced by designing the open faces of the respective hoods in such fashion that their height H will be at least equivalent to the height of the containers being coated, and preferably will have a height which is 10–20 percent greater or even more. Additionally, the hoods will advantageously be mounted in such fashion that the horizontal projection of the containers being coated will be centrally and symmetrically located with respect to height H of the respective open faces 18 and 20, thereby ensuring an impinging relationship of the airflow with respect to the height of the containers.

Hoods 14 and 16 fluidly communicate with a source of negative pressure such as, for example, ducts 24 and 26 respectively which are fluidly connected to the suction side of a suitable fan or blower (not shown). Thus, because of the negative pressure in ducts 24 and 26, separate and oppositely directed horizontal flows of air will exist across the conveyor and the containers being transported therealong. In the embodiment of FIG. 1, the flow of air to hood 16 generally proceeds from left to right whereas the flow to hood 14 is from right to left, both airflows, however, being normal to the direction of container movement along the conveyor. Additionally, the velocity magnitude of the respective horizontal air flows will be advantageously adjusted, either by means of suitable dampers or by the fan or blower selection, such that it will be slightly less than the velocity which would cause a transverse movement of the container on the conveyor. The superficial horizontal velocity across the conveyor will, however, preferably be at least about 10 to 15 feet per second.

On the side of the conveyor opposite hood 16, and generally in the flow of air to open face 20, are located means for electrostatically spraying a solution of the treating material onto the external surfaces of the containers 12 as they are transported by the conveyor. These means include electrostatic spray guns 28 and 30 respectively, both of which are preferably mounted to a supporting member 32, in such manner that the guns are horizontally disposed, i.e., parallel to the plane of the conveyor and yet are inclined with respect too the direction of movement of containers 12 along conveyor 10. The spray guns are so mounted to member 32 such that the axis of gun 28, and hence the axis of the spray pattern produced thereby, is inclined in a downstream direction with respect to the direction of movement of the containers along conveyor 10, while the axis of gun 30 is inclined upstream. According to the preferred embodiment, the angle of inclination will be about 40° but angles in the general range of 25°-50° may also be advantageously employed. Additionally, while guns 28 and 30 may be so positioned that their respective spray patterns partially or totally overlap at a location along the path of the conveyor through which the containers are transported, it is preferred that the guns be so positioned with respect to each other that they each produce independent spray patterns through which the containers are transported for treatment. That is, gun 28 would be so positioned that a container, while in the horizontal flow of air across the conveyor to face 20, would first be contacted by the spray pattern exclusively provided by gun 28; this same container is then transported a further distance along the conveyor and, while in the oppositely directed horizontal air flow, is contacted by the electrostatic spray pattern exclusively provided by gun 30.

For purposes of operating the electrostatic spray guns, both gun 28 and gun 30 are fluidly connected to a suitable conduit or pipe 34 by means of which the solution which is to be atomized and electrostatically sprayed is supplied to the gun. The solution may be supplied in any conventional manner such as, for example, by a gravity feed arrangement. Additionally, the electrostatic spray guns are electrically connected to one terminal of a high-voltage supply source 36 for purposes of producing the electrically charged spray. The other side or terminal of high voltage source 36 is connected to the ground and, if desired, conveyor 10 may be electrically connected to the grounded terminal. Generally, however, this latter connection is not required because the conveyor is inherently grounded. If desired, the reverse electrical connection may be employed, that is, the conveyor may be connected to the high voltage terminal and the spray gun grounded with equally desirable results.

The electrostatic spray guns and high-voltage supply source used herein are well known in the art and may be commercially procured from numerous manufacturers including Ransburg Electro-Coating Corporation, Eclipse Equipment Company and the DeVilbiss Company of Toledo, Ohio. One suitable gun and power source which may be advantageously employed in the practice of this invention is a product of the Ransburg Electro-Coating Company of Indianapolis, Indiana and is described in their 1964 copyrighted publication entitled R-E-A Gun Operation and Maintenance Manual. The electrostatic spray guns and power supplies are also described in numerous patents issued to the Ransburg Electro-Coating Corporation.

Opposed to the electrostatic spray guns just described is another pair of electrostatic spray guns 38 and 40 which are fed with the treating solution by means of pipes or conduits 42. The latter pair is positioned upstream of guns 28 and 30 and is disposed opposite open face 18 of hood 14. Guns 38 and 40 are mounted to a support member 44 and are electrically connected to a high voltage supply source 46. As is the case with guns 28 and 30, guns 38 and 40 are likewise horizontally disposed with respect to the plane of the container-transporting surface of conveyor 10 and their axes, and hence the axes of their respective spray patterns, are inclined with respect to the direction of container movement along conveyor 10; electrostatic spray gun 38 is inclined downstream and gun 40 upstream in such fashion that they each produce independent spray patterns.

In actual operation, a series of containers 12 are continuously transported along conveyor 10 in a direction proceeding left to right as shown in FIG. 1. A container which is to be treated is first transported into the horizontal flow of air which is directed toward open face 18 of hood 14. While in this air flow, the container is transported into the electrostatic spray pattern of gun 38, out of this pattern, and then into the spray pattern of electrostatic gun 40. The container continues along conveyor 10 whereby it is removed from the air flow of hood 14 and transported into an oppositely directed air flow proceeding across the conveyor to open face 20 of hood 16. While in this latter flow of air, the side of the container generally opposite that which was sprayed by guns 38 and 40 is sprayed by a electrostatic guns 28 and 30. That is, while in the flow of air to face 20, the container first enters the electrostatic spray pattern zone of gun 28 and then proceeds to the independent spray pattern of electrostatic gun 30.

The metal oxide film-forming organic compounds which are advantageously used in the practice of this invention are those organometallic compounds which pyrolyze at a glass surface when it is at a temperature in excess of the pyrolyzing temperature of the compound employed to form a colored metal oxide coating on the glass surface. These compounds are old in the art and among others include the metal acetyl acetonates, metal hexanoates, preferably the metal 2-ethyl hexanoate, and metal octanoates. Thus, colored oxides may be formed on a glass by treating the surface, for example, with acetyl acetates of iron, aluminum, cobalt, vanadium, copper, manganese, nickel, and chromium. The oxides of iron, aluminum, cobalt, vanadium, copper, nickel and chromium may likewise be formed by treating the glass surface with hexanoate or octanoate compounds of the corresponding metal. Of course, mixtures of the various organometallic compounds may also be used.

As hereinbefore indicated, the above noted types of metal oxide film-forming organometallic compounds are electrostatically sprayed as a solution and applicant has found that the particular solvent system employed is important. The invention will most advantageously be practiced by using a nonflammable solvent system, i.e., a solvent system which has a flash point sufficiently high so as not to burst into flames when electrostatically sprayed onto the surface of a hot glass container. The invention will also be advantageously practiced by using a solvent system capable of at least dissolving and containing in solution about 12 grams of the metal oxide film-forming organometallic compound per 100 ml. of solution.

A suitable solvent system will contain a nonflammable halogenated organic solvent and most advantageously will be a chlorinated compound having one or two carbon atoms. Thus, a suitable solvent system will advantageously include one or more of the following compounds: 1, 1, 1-trichloroethane; 1, 1, 2 trichloroethylene; trans-1,2-dichloroethylene, methylene chloride, trichloroethylene; tetrachloroethane, and bromoform. Of course, normally flammable compounds such as benzene may be employed in an admixture with the above compounds, provided the resultant admixed solvent system remains nonflammable.

Preferred solvent systems for the above metal oxide film forming compounds, for example, ferric acetyl acetonate, are summarized in Table I. It will be noted that the respective solvent systems, which are designated A, B, and C, are binary systems, and that in each case mixtures of the individual constituents of each binary system have a higher solution power than do the individual constituents taken alone. For example, Solvent System A is composed of methylene chloride and trichloroethylene, the former compound having a maximum solubility of ferric acetyl acetonate of 31.6 grams per 100 ml. of solution and the latter having a maximum solubility of 16.6 grams. In contrast, a solvent system comprised of methylene chloride and trichloroethylene in the volumetric ratio of 1:1 has a maximum solubility of about 72.2 grams per 100 ml.

These increased solvent powers of the binary systems have an important practical advantage in that a solution may be employed which has a substantial concentration of the film-forming compound and yet the concentration will be sufficiently removed from the maximum or saturated solubility value so as to preclude undesired and premature crystallization. If not precluded, or at least substantially minimized, premature crystallization creates a solution having an uncontrolled metal content and will generally cause a plugging or clogging of the electrostatic spray guns. More importantly, however, and bearing in mind that the above types of metal oxide film forming compounds are known to form the oxide on a glass surface at a relatively low rate because of lower concentrations hereinbefore used, these oxides may now be formed at substantially increased rates because of the higher concentrations which may now be employed.

TABLE I

SOLVENT SYSTEM

Percent of Solvent Constituents by Volume

| A. Methylene Chloride | Trichloroethylene | Solubility of ferric acetyl acetonate in g. per 100 ml. of Solution |
|---|---|---|
| 0 | 100 | 16.6 |
| 100 | 0 | 31.6 |
| 25 | 75 | 53.9 |
| 50 | 50 | 72.2 |
| 75 | 25 | 53.6 |

| B. 1,1,1 Trichloroethane | Trichloroethylene | |
|---|---|---|
| 0 | 100 | 16.6 |
| 100 | 0 | 16.2 |
| 75 | 25 | 20.7 |
| 50 | 50 | 20.0 |
| 25 | 75 | 16.6 |

| C. Methylene Chloride | 1,1,1 Trichloroethane | |
|---|---|---|
| 0 | 100 | 16.2 |
| 100 | 0 | 31.6 |
| 25 | 75 | 51.6 |
| 50 | 50 | 52.4 |
| 75 | 25 | 50.9 |

In order to allow those skilled in the art to practice the above-described invention, the following is a summary of a preferred mode of operation.

A treating solution of ferric acetyl acetonate in a solvent system which consisted of about 20 parts methylene chloride and about 80 parts trichloroethylene was prepared having a concentration of about 1.2 pounds of ferric acetyl acetonate per gallon of solution. This solution was supplied to the electrostatic spray guns by a gravity feed arrangement and each of the spray guns was connected to a 60,000 volt power supply. The angle of inclination of the guns was approximately 40° and the guns were so mounted that each produced an independent and separate fan-shaped spray pattern, above the conveyor, through which the transported containers passed in succession. The hoods were so located that their open faces were located several inches from the edge of the conveyor and the ducts were fluidly united with an air blower having sufficient capacity to produce an air velocity at each of the open faces of about 40 feet per second.

The containers were transported along the conveyor at a speed of about 125 containers per minute. They were freshly formed and had a temperature in the range of 700° to 1,300°

F. A sufficient amount of the treating solution was electrostatically sprayed onto the containers by the respective guns to form a golden colored iron oxide coating. Upon completion of the run, it was noted that the golden colored containers possessed no undesirable grainy appearance or dust accumulation and that the coating was highly uniform.

Thus, it will be readily apparent to those skilled in the art that glass containers can now be provided with superior metal oxide coatings at rates which are significantly higher than rates heretofore obtained.

I claim:

1. A method for forming a colored metal oxide coating having a uniform thickness on the surface of a hot glass container as it is nonrotatably transported in an upright position along a conveyor having a container-supporting surface which comprises: creating a flow of air across said container-supporting surface which is parallel thereto, said flow of air having a direction of movement substantially normal to the direction of movement of said transported container and being in impinging relationship therewith, and electrostatically spraying said container with a liquid solution of a pyrolyzable colored metal oxide film-forming organometallic compound in a nonflammable solvent system containing a halogenated organic solvent while in said flow of air and while said container is at a temperature in excess of the pyrolyzing temperature of said compound; creating another flow of air across said container-supporting surface which is parallel thereto but oppositely directed with respect to said former flow of air, said latter flow of air having a direction of movement normal to the direction of movement of said transported container and being in impinging relationship therewith, and electrostatically spraying said container with said liquid solution while in said latter flow of air and while at a temperature in excess of the pyrolyzing temperature of said compound, said liquid solution being applied in an amount sufficient to form a colored metal oxide coating thereon having a uniform thickness.

2. The method of claim 1, wherein said organometallic compound is ferric acetyl acetonate and said solvent system consists of a mixture of (a) methylene chloride and trichloroethylene, or (b) trichloroethylene and 1,1,1 trichloroethane or (c) methylene chloride and 1,1,1 trichloroethane.

3. The method of claim 2 wherein said mixture is a mixture of methylene chloride and trichloroethylene.

4. The method of claim 2 wherein said container is electrostatically sprayed with a fan-shaped spray pattern having an axis which is inclined with respect to the direction of container transportation along said conveyor.

5. The method of claim 1 wherein said halogenated organic solvent is a chlorinated organic compound having up to two carbon atoms.

6. The method of claim 5 wherein said organometallic compound is a member selected from the group consisting of a metal acetyl acetonate, a metal hexanoate and a metal octanoate.

7. The method of claim 6 wherein said solution contains at least 12 grams of said pyrolyzable organometallic compound per 100 milliliters of solution.

8. The method of claim 6 wherein said chlorinated organic compound is a member selected from the group consisting of 1,1,1-trichloroethane, 1,1,2-trichloroethane, 2 dichloroethylene methylene chloride, tetrachloroethane, trichloroethylene and mixtures thereof.

9. The method of claim 6 wherein said solvent system consists essentially of a mixture of trichloroethylene and a member selected from the group consisting of methylene chloride and 1,1,1 trichloroethane.

10. The method of claim 6 wherein said solvent system consists essentially of a mixture of methylene chloride and a member selected from the group consisting of trichloroethylene and 1,1,1 trichloroethane.

11. A method for forming uniform colored metal oxide coating on the external surface of freshly formed glass containers as they are nonrotatably transported in an upright position along a conveyor having a container-supporting surface from a glass forming machine to an annealing lehr which comprises: creating a first flow of air across said container-supporting surface which is parallel thereto, said first flow of air having a direction of movement normal to the direction of container movement along said conveyor and being in impinging relation with respect to said transported containers, and, while said container is transported through said flow of air, directing at least two electrostatically atomized sprays of a nonflammable solution of a pyrolyzable colored metal oxide film-forming organometallic compound which is a hexanoate or an octanoate or an acetyl acetonate in a solvent system consisting essentially of a chlorinated organic compound having up to two carbon atoms or mixtures of such compounds onto said container in an amount sufficient to form a uniform colored metal oxide coating thereon; creating a second flow of air across said container-supporting surface which is parallel thereto, said second flow of air having a direction of movement normal to the direction of container movement along said conveyor and being in impinging relation with respect to said transported containers but oppositely directed with respect to said first flow of air and, while said container is transported through said second flow of air, directing at least two electrostatically atomized sprays of said solution onto said container in an amount sufficient to form a uniform colored metal oxide coating thereon, said latter two sprays being oppositely directed with respect to said first two sprays.

12. The method of claim 11 wherein the axis of the respective sprays are parallel to said container-supporting surface and inclined with respect to the direction of container movement along said conveyor.

13. The method of claim 12 wherein said organometallic compound is ferric acetyl acetonate and said solvent system consists essentially of a mixture of methylene chloride and trichloroethylene.

14. The method of claim 12 wherein the spray patterns of each of said sprays above said conveyor are independent.

* * * * *